United States Patent [19]

Marcie et al.

[11] Patent Number: 4,937,730
[45] Date of Patent: Jun. 26, 1990

[54] CONSTANT VOLTAGE POWER SUPPLY

[75] Inventors: Mark J. Marcie, Walled Lake; John P. Williams, Jr., Redford, both of Mich.

[73] Assignee: Daykin Electric Corporation, Livonia, Mich.

[21] Appl. No.: 262,468

[22] Filed: Oct. 25, 1988

[51] Int. Cl.⁵ .......................... H02B 1/56; H02M 5/02
[52] U.S. Cl. ...................... 363/141; 363/13; 323/267; 361/383; 174/67
[58] Field of Search .............. 363/13, 17–26, 363/95–98, 131–136, 141; 323/267, 355–359; 361/383, 384; 174/66, 67

[56] References Cited

U.S. PATENT DOCUMENTS 3,857,044 12/1974 Papoi et al. .................... 361/383 X
4,138,187 2/1979 Brygger ........................ 174/67 X
4,660,136 4/1987 Montorefano ................. 323/267 X Primary Examiner—Peter S. Wong
Assistant Examiner—Emanuel Todd Voeltz
Attorney, Agent, or Firm—Barnes, Kisselle, Raisch, Choate, Whittemore & Hulbert

[57] ABSTRACT

A constant voltage power supply that includes an enclosure and a transformer positioned within the enclosure. The transformer has a primary winding and first and second sets of secondary windings mounted and magnetically coupled to each other all on a single magnetic core structure. The primary winding is connected by primary circuitry to a source of electrical power. First secondary circuitry is connected to the first secondary winding set for supplying electrical power at regulated constant voltage. Second secondary circuitry is connected to the second secondary winding set for supplying auxiliary power at unregulated voltage.

5 Claims, 1 Drawing Sheet

CONSTANT VOLTAGE POWER SUPPLY

FIELD

The present invention is directed to constant voltage power supplies, and more particularly to a power supply for providing both regulated and unregulated output voltages from a single supply input.

BACKGROUND

There are many instances in industrial and other applications in which it is desirable to provide both regulated and unregulated power from a utility power source. For example, voltage-sensitive equipment such as programmable logic controllers require precise regulation of input power. However, other electrical equipment in the same environment, such as interior panel lights and other auxiliary devices, do not require precise regulation of input voltage, and connection of such devices to a regulated power source is inefficient and costly. Furthermore, auxiliary devices cannot be powered from the regulated source when it is shut off for inspection, maintenance, repair and the like of the equipment connected to it. In applications of this character, it has heretofore been proposed to provide separate power supplies for connecting the voltage-sensitive and auxiliary devices to the utility power source.

SUMMARY OF THE INVENTION

A power supply includes a transformer having a primary winding and first and second sets of secondary windings, with all of the windings on and magnetically coupled to each other by a single magnetic core structure. Regulated power is provided by interconnecting the first set of windings with capacitor circuitry, and unregulated power is provided by the secondary windings. The regulated and unregulated power is provided through suitable disconnects and, preferably, circuit breakers.

It is a general object of the present invention to provide a power supply for applications of the described character that includes facility for supplying both regulated and unregulated power from a single connection to the power source. Another and more specific object of the invention is to provide a constant voltage power supply of the described character that is inexpensive to manufacture, and that is economical and efficient to operate over an extended useful life.

DRAWINGS

The invention, together with these and additional objects, features and advantages thereof, will be best understood from the following detailed description, appended claims and accompanying drawing which:

FIG. 1 is a partially sectioned front elevational view of a constant voltage power supply in accordance with a presently preferred embodiment of the invention; and FIG. 2 is an electrical schematic diagram of the power supply illustrated in FIG. 1.

DETAILED DESCRIPTION

Figure 1:
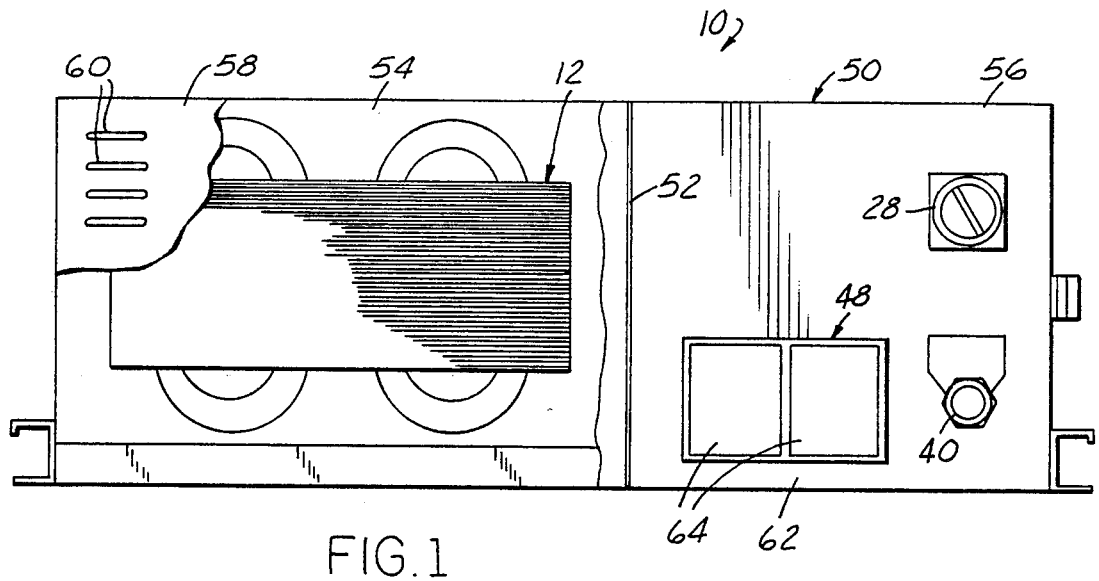

The drawing illustrates a power supply 10 in accordance with a presently preferred embodiment of the invention as comprising a transformer 12 that has a primary winding 14, a first set of secondary windings 16, 18, 20 and a second or auxiliary secondary winding 22, all of which are wound upon and magnetically interconnected by a single integral magnetic core structure 24. The primary winding 14 is connected through fuses 26 and a double-pole toggle switch 28 to terminals 30 for connection to utility power, such as 460 VAC, 60 Hz, single phase power. Secondary windings 16–20 are electrically interconnected in the usual manner to a capacitor bank 32 to supply constant regulated voltage, such as 120 VAC ±1%, across a pair of terminal connectors 34 through a circuit breaker 36 and a disconnect 38.

A lamp 40 (FIGS. 1 and 2) is connected across auxiliary secondary winding 22 for indicating application of electrical power through closure of switch 28. Auxiliary secondary winding 22 provides unregulated voltage, such as 120 VAC, across a pair of terminal connectors 42 through a circuit breaker 44 and a disconnect 46. A pair of duplexed electrical female receptacles 48 are connected across terminal strips 42 for connection of auxiliary equipment to unregulated power. With the separate disconnects 38 and 46, the regulated and unregulated power outputs at terminals 34 and 42 can be each turned on and off independently of the other.

Figure 2:
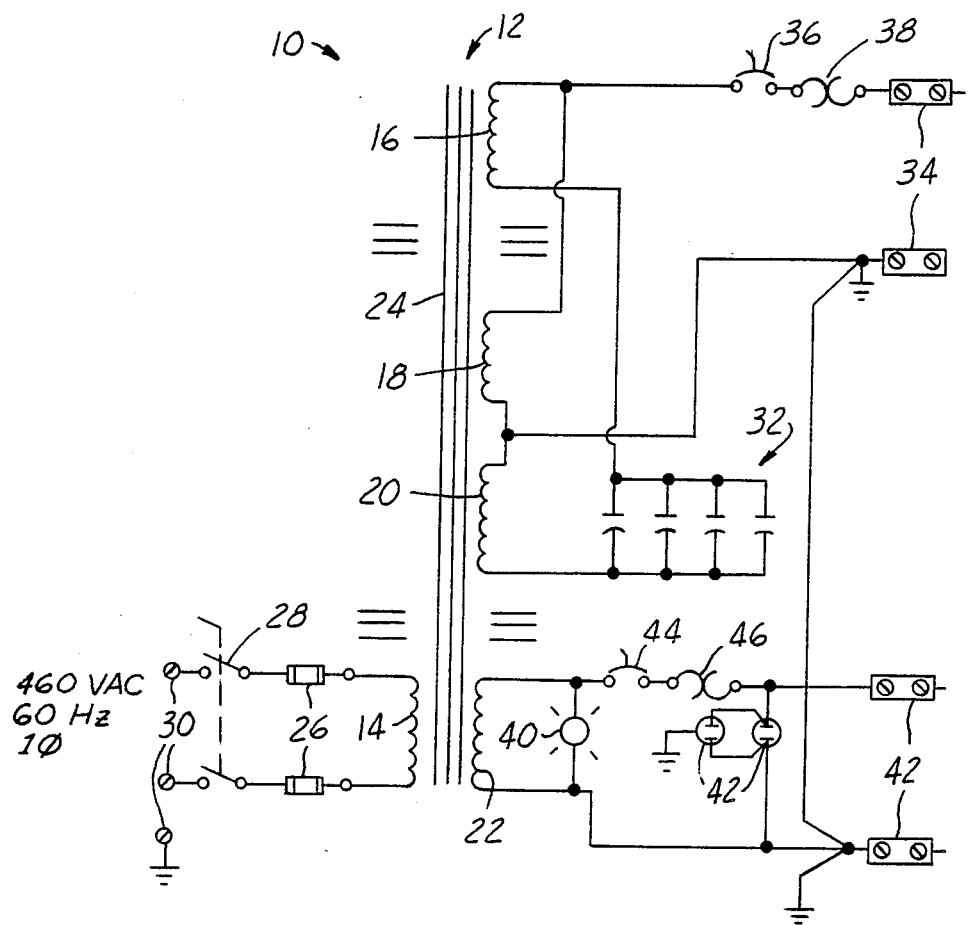

As shown in FIG. 1, power supply 10 is contained within a single enclosure 50 of construction suitable for rack-mounting of the power supply. Enclosure 50 includes an internal wall 52 for dividing the enclosure into a first section 54 in which transformer 12 is contained, and a second section 56 which contains the remainder of the power supply circuitry heretofore described in connection with FIG. 2. A front panel 58 on enclosure section 54 includes louvered apertures 60 for admitting air to cool transformer 12. Enclosure section 56 is sealed by a front panel 62 on which switch 28 and lamp 40 are mounted. Duplexed receptacles 48 are also mounted on panel 62 and have self-closing gasketed covers 64 for preventing contamination for the receptacles when not in use. Preferably, the second section 56 is oil tight and sealed to comply with the electrical and fire hazard safety requirements of NEMA 12.

We claim:

1. A constant voltage power supply comprising: an enclosure, a transformer positioned within said enclosure and having a primary winding and first and second secondary windings carried and magnetically interconnected on a single magnetic core structure, primary circuit means for connecting said primary winding to a source of electrical power, first secondary circuit means connected to said first secondary winding and responsive to magnetic flux generated in said first secondary winding for supplying electrical power at regulated constant voltage, and second secondary circuit means connected to said second secondary winding and responsive to magnetic flux generated in said second secondary winding for supplying auxiliary electrical power at unregulated a.c. voltage at utility voltage level, said second secondary circuit means includes female duplex a.c. receptacles mounted on said enclosure for external connection to said auxiliary electrical power.

2. The power supply set forth in claim 1 wherein said enclosure comprises means dividing said enclosure into first and second enclosure sections, said first enclosure section containing said transformer and including means for admitting air to cool said transformer, said second enclosure section containing said primary, said first secondary and said second secondary circuit means and being sealed from surrounding air.

3. The power supply set forth in claim 1 wherein said duplex receptacles include self-closing covers.

4. A constant voltage power supply comprising: an enclosure, a transformer positioned within said enclosure and having a primary winding and first and second secondary windings carried and magnetically interconnected on a single magnetic core structure, primary circuit means for connecting said primary winding to a source of electrical power, first secondary circuit means connected to said first secondary winding and responsive to magnetic flux generated in said first secondary winding for supplying electrical power at regulated constant voltage, and second secondary circuit means connected to said second secondary winding and responsive to magnetic flux generated in said second secondary winding for supplying auxiliary electrical power at unregulated a.c. voltage at utility voltage level, said second secondary circuit means including female duplex a.c. receptacles mounted on said enclosure for external connection to said auxiliary electrical power, said enclosure comprising means dividing said enclosure section containing said transformer and including means for admitting air to cool said transformer, said second enclosure section containing said primary, said first secondary and said second secondary circuit means and being sealed from surrounding air.

5. The power supply set forth in claim 4 wherein said duplex receptacles include self-closing covers.

* * * * *